(No Model.)
J. C. HENDRY.
STEAM TRAP.
No. 292,914.  Patented Feb. 5, 1884.
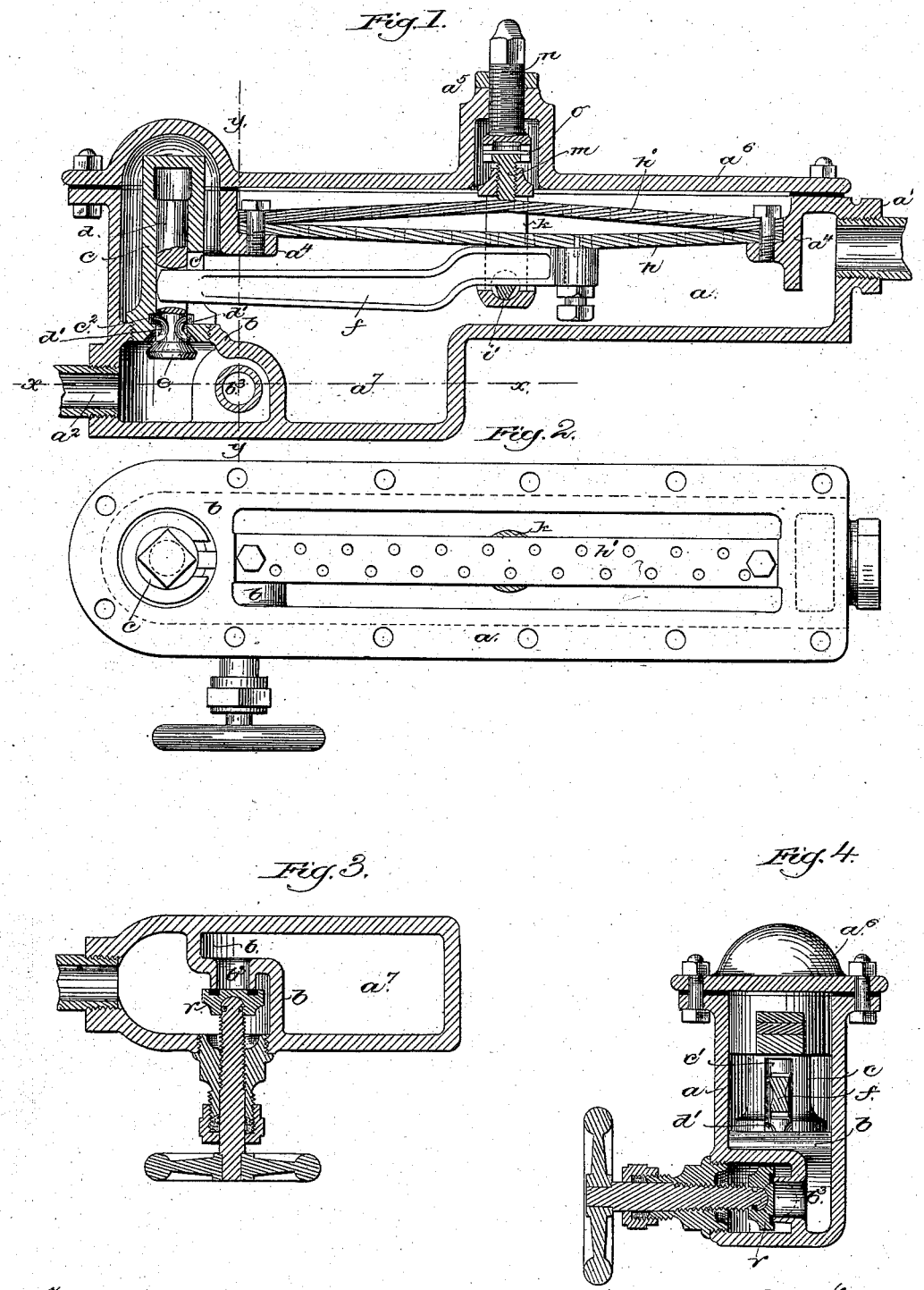
Witnesses.
John F. C. Prinkert
W. H. Sigston
Inventor:
John C. Hendry
by Crosby & Gregory, attys.

UNITED STATES PATENT OFFICE.

JOHN C. HENDRY, OF BOSTON, MASSACHUSETTS.

STEAM-TRAP.

SPECIFICATION forming part of Letters Patent No. 292,914, dated February 5, 1884.

Application filed August 27, 1883. (No model.)

*To all whom it may concern:*

Be it known that I, JOHN C. HENDRY, of Boston, county of Suffolk, State of Massachusetts, have invented an Improvement in Steam-Traps, of which the following description, in connection with the accompanying drawings, is a specification, like letters on the drawings representing like parts.

My invention relates to a steam-trap in which air or water of condensation is automatically separated from steam by difference in temperature, and has for its object to render the apparatus more delicate and certain in operation than others of this class heretofore employed.

In the present invention two expanding bars are employed in combination with a lever connected with the valve controlling the escape of fluid from the chamber of the trap, the fulcrum of the said lever being moved by one of the said bars, and its short arm by the other, while its long arm is connected with the valve, which thus receives a greatly magnified movement from the expansion of the said bars. The main chamber of the trap is provided with a depressed portion constituting a sediment-chamber below the level of the automatic valve, the said sediment-chamber having an outlet-passage leading to the main discharge-pipe of the trap, and controlled by a hand-operated valve, so that the sediment may be discharged through the regular main discharge-passage of the trap without passing through the passage controlled by the automatic valve, and thereby cutting the said valve or its seat.

Figure 1 is a longitudinal section of a steam-trap embodying this invention; Fig. 2, a plan view thereof with the cover or bonnet removed; Fig. 3, a horizontal section in line $x\,x$, Fig. 1, of the sediment-chamber and its outlet and hand-operated valve; and Fig. 4, a vertical section on line $y\,y$, Fig. 1.

The main case or body $a$ is provided with an inlet-opening, $a'$, adapted to be attached to the steam-pipe or receptacle from which air or water of condensation is to be permitted to escape without allowing the escape of steam, and an outlet-passage, $a^2$, separated from the said inlet-passage by partition $b_x$ containing a threaded opening, $b'$, Fig. 1, into which is screwed the valve holder $c$, having a tubular passage through it, forming a guide for the stem $d$ of the valve $e$, that is automatically actuated by a lever, $f$, as will be described. The end of the said lever $f$ enters an opening in the stem $d$ through a slot, $c'$, in the valve-holder $c$, which has an annular groove or port, $c^2$, surrounding the valve-stem and communicating with the said slot $c'$ and main portion of the chamber $a$, connected with the inlet-passage $a'$. The valve-stem $d$ has a series of cup-shaped recesses, $d'$, which, when the valve $e$ is removed from its seat in the end of the holder $c$, as shown in Fig. 1, afford a passage from the slot $c'$ and groove $c^2$ into the outlet chamber or space below the partition $b$, communicating with the outlet $a^2$. When, however, the valve is seated, its stem just above the valve $e$ will wholly fill the tubular passage in the holder $c$, and the pressure in the cup-shaped recesses $d'$ will be balanced, so that there will be no tendency to unseat the valve until positively moved by the actuating-lever $f$. The short arm of the said lever $f$ is connected with a curved or bent expansion-bar, $h$, slightly longer than the space between its holding-abutments $a^4$ in the case $a$, the said bar being made of any suitable or usual material having a higher co-efficient of expansion than the material of which the case $a$ is made, so that when the temperature of the entire apparatus is raised the said bar will be bent still more, or its point of attachment with the lever $f$ will move downward from the position shown in Fig. 1, thus tending to raise the long arm of the said lever and the connected valve-stem and valve, to bring the latter to its seat.

The lever $f$ has its fulcrum $i$ in a yoke, $k$, supported on a second expansion-bar, $h'$, similar to the one $h$, but bent in the opposite direction, so that when its expansion is greater than that of the case $a$ the point on which the yoke $k$ and fulcrum $i$ are supported will be raised, thus tending to raise the long arm of the lever $f$ and the valve $e$ still farther. In order to adjust the movement of the valve so that it will close when the apparatus rises above a certain temperature and open when below the said temperature, the yoke $k$ and fulcrum $i$ for the lever $f$ are made adjustable with relation to the bar $h'$ by a fulcrum-adjusting device, (shown as an adjusting-screw, $m$,) by which the yoke $k$ is supported on the bar $h'$, the said screw $m$ having its head connected with a screw, $n$, passing through a threaded opening, $a^5$, in the cap or bonnet of the apparatus, so as to be operated by a wrench on the outside of the case, it being properly connected with the screw $m$ to cause the latter to turn with it, but permit it to have an independent longitudinal movement under the influence of the expanding bar $h'$, the said connection being shown in this instance as consisting of a pin, $o$, entering deep notches in the end of the screw $n$.

That portion of the case $a$ near the outlet-passage $a^2$ is depressed below the remainder, to form a sediment-chamber, $a^i$, in which the particles of solid matter carried by the steam and water of condensation will settle, and the portion $b$ is provided with a passage, $p^3$, controlled by a hand-operated valve, $r$, so that the sediment collected may be blown out through the said passage $b^3$ and into the regular outlet $a^2$ of the trap without passing through the passage controlled by the automatic valve $e$. The valve-holder $c$ is provided with a squared head, (see Fig. 2,) so that it may be engaged by a wrench and removed from the trap when desired.

I claim—

1. In a steam-trap, the combination of two expansion-bars with a valve-actuating lever having its fulcrum and one arm connected with the said bars, and the valve connected with the other arm of the said lever, substantially as described.

2. In a steam-trap, the expansion-bars and valve-actuating lever connected therewith, combined with the fulcrum-adjusting device, substantially as and for the purpose described.

3. In a steam-trap, the main chamber or casing provided with inlet and outlet openings, and a partition separating the said openings, having two independent passages, combined with an automatically-operated valve controlling the flow of fluid through one of the said passages, and a hand-operated valve controlling the flow of fluid through the other of the said openings, and affording an independent discharge of the fluid to the outlet of the main casing, substantially as described.

4. In a steam-trap, the main casing provided with inlet and outlet openings, and a partition separating them, combined with the tubular slotted valve-holder provided with an annular groove, and the valve and valve-stem provided with cup-shaped recesses, to operate substantially as described.

5. In a steam-trap, the case provided with inlet and outlet openings, and a valve to control the flow of fluid therethrough, combined with a bent expansion-bar, abutments supporting it at its ends, and the valve-actuating lever having one arm connected with the before-mentioned valve, and its other arm connected with and actuated by the lateral movement of the expansion-bar between its ends, substantially as described.

6. In a steam-trap, the main chamber or casing provided with inlet and outlet openings, and a partition separating the said openings, having two independent passages, one above the level of the other, the said casing on the inlet side of the said partition having a depressed portion constituting a sediment-chamber, combined with an automatically-operated valve controlling the flow of fluid through the higher of the said passages, and the hand-operated valve controlling the flow of fluid through the lower of the said passages, whereby the sediment may be blown from the sediment-chamber into the outlet-passage of the main chamber, substantially as described.

In testimony whereof I have signed my name to this specification in the presence of two subscribing witnesses.

JOHN C. HENDRY.

Witnesses:
  JOS. P. LIVERMORE,
  W. H. SIGSTON.